W. G. Hamilton.
Water Elevator.

Nº 87,408. Patented Mar. 2, 1869.

Witnesses:
Wm A Morgan
P. C. Dieterich.

Inventor:
W. G. Hamilton
per Mimmo
attorneys

W. G. HAMILTON, OF MILTON, WISCONSIN.

Letters Patent No. 87,408, dated March 2, 1869.

IMPROVEMENT IN WATER-ELEVATORS.

The Schedule referred to in these Letters Patent and making part of the same.

*To all whom it may concern:*

Be it known that I, W. G. HAMILTON, of Milton, in the county of Rock, and State of Wisconsin, have invented a new and useful Improvement in Water-Elevators; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
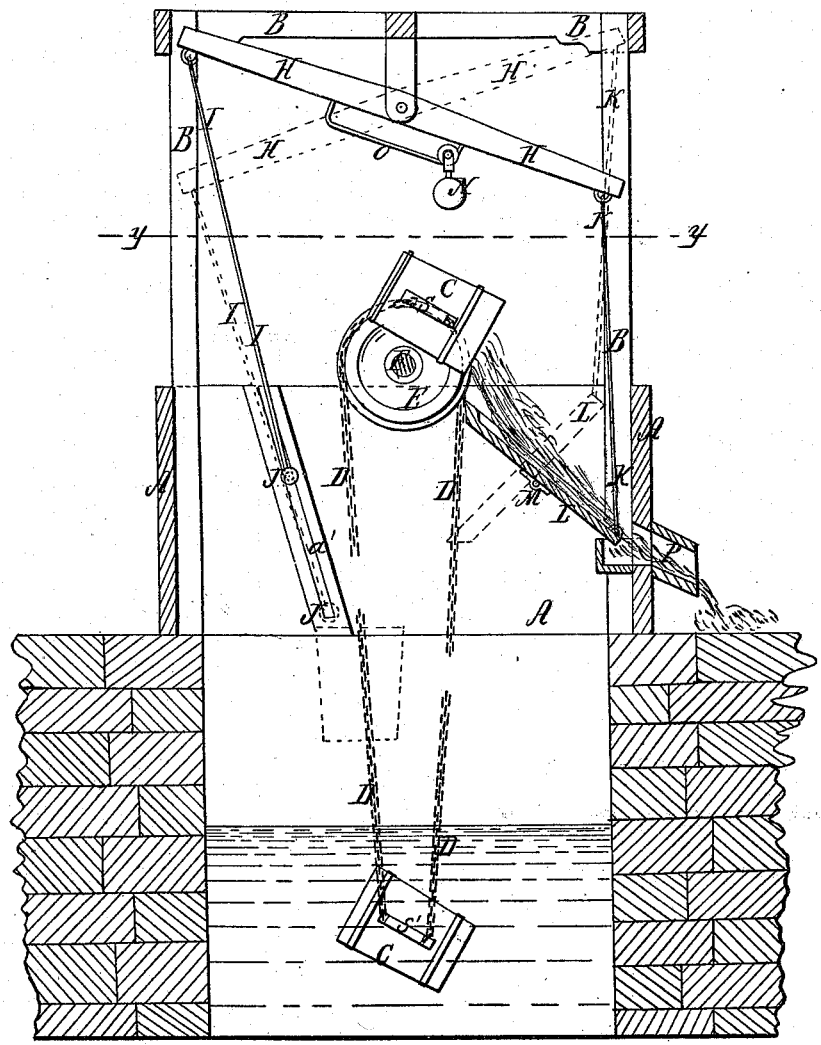
Figure 1 is a vertical section of my improved device, attached to a well-curb, taken through the line $x\ x$, fig. 2.

My invention has for its object, to furnish an improved apparatus for raising water, which shall be simple and durable in construction, and convenient and effective in operation; and It consists in the construction and combination of the various parts of the apparatus, as hereinafter more fully described.

A represents the well-curb, the frame B of which extends upward, and may be covered with a roof, or not, as may be desired.

C are the buckets, to the opposite sides of which are attached two longitudinal projecting plates S, to the ends of which are attached two chains D, as shown in the drawings, in such a way that the said buckets may pass up, mouth upward, and descend, mouth downward.

The chains D pass over pulleys E, formed upon or attached to the crank-shaft or axle F, to one end of which the crank G is attached, for operating the apparatus.

Figure 2:
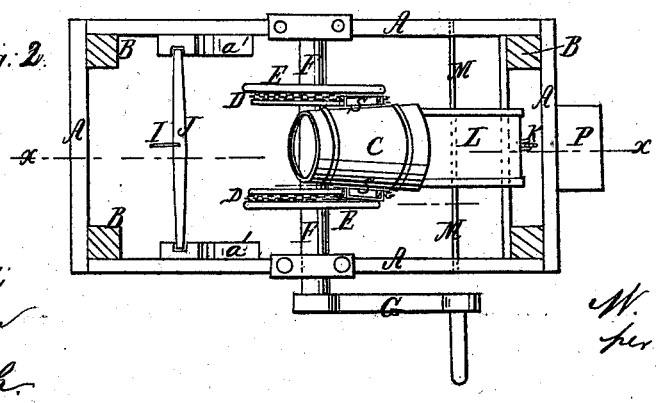
Figure 2 is a horizontal section of the same, taken through the line $y\ y$, fig. 1.

The pulleys E are so formed and arranged that the buckets C may pass between them, as shown in figs. 1 and 2.

By this construction and arrangement, by operating the crank G, the full buckets will ascend upon one side of the axle or shaft F, discharge their contents as they pass over said shaft, and descend upon its other side, to be again filled.

H is a beam, hung from and pivoted to the central cross-bar $b'$ of the upper part of the frame B.

To one end of the beam H is pivoted the upper end of the rod I, the lower end of which is attached to the cross-head or bar J, the ends of which work up and down inclined grooves $a'$, formed in or upon the inner sides of the curb A, as the said beam H is oscillated.

To the other end of the beam H is pivoted the upper end of the rod K, the lower end of which is pivoted to the forward part of the spout L.

The spout L is attached, at or near the central part of its bottom, to the rod or shaft M, the ends of which are pivoted to the sides of the curb A.

N is a weight, which moves back and forth along the rod O, attached to the under side of the middle part of the beam H, as shown in fig. 1.

By this arrangement, as the full buckets C rise, they strike and raise the cross-bar J, and raise it until the inclination of the grooves $a'$ carries the said cross-bar away from the said buckets, allowing the buckets to pass the said bar J.

The upward movement of the bar J raises the end of the beam H, with which it is connected, and consequently depresses its other end.

This movement of the beam H depresses the outer end of the pivoted spout L, and raises its inner end into such a position as to receive the water as it is discharged from the buckets C, and conduct it into the stationary receiving-spout P, from which it flows into the receiving-vessel.

It will be observed, that as the pivoted beam H oscillates in either direction, the weight N moves toward the lower end of said beam H, and, by its weight, holds the various parts connected with said beam stationary, until the said beam is again moved by the action of the ascending buckets upon the cross-bar J, or by the action of the descending buckets upon the inner end of the pivoted spout L.

I claim as new, and desire to secure by Letters Patent—

1. The combination of the crank-shaft G F, pulleys E, chains D, flange-plates S, and buckets C, with each other, substantially as herein shown and described, and for the purpose set forth.

2. The combination of the cross-bar J, rod I, pivoted beam H, moving-weight N, rod K, and pivoted spout L, with each other, and with the endless chain of buckets, C D S, substantially as herein shown and described, and for the purposes set forth.

The above specification of my invention signed by me, this 26th day of September, 1868.

W. G. HAMILTON.

Witnesses:
W. H WEAVER,
EDGAR WEAVER.